United States Patent
Kawaura et al.

(10) Patent No.: US 7,890,608 B2
(45) Date of Patent: Feb. 15, 2011

(54) ELECTRONIC-DATA DISTRIBUTION SYSTEM

(75) Inventors: Naoto Kawaura, Tokyo (JP); Takayuki Yanase, Tokyo (JP); Nobuyuki Kobayashi, Tokyo (JP)

(73) Assignee: Hitachi Software Engineering Co., Ltd., Tokyo (JP)

( * ) Notice: Subject to any disclaimer, the term of this patent is extended or adjusted under 35 U.S.C. 154(b) by 164 days.

(21) Appl. No.: 12/392,142

(22) Filed: Feb. 25, 2009

(65) Prior Publication Data

US 2010/0057817 A1 Mar. 4, 2010

(30) Foreign Application Priority Data

Jun. 6, 2008 (JP) .............................. 2008-148866

(51) Int. Cl.
G06F 15/16 (2006.01)
G06F 15/177 (2006.01)
G06F 9/44 (2006.01)

(52) U.S. Cl. ...................................... 709/219; 717/172
(58) Field of Classification Search ......... 717/168–173; 709/219, 220
See application file for complete search history.

(56) References Cited

U.S. PATENT DOCUMENTS

| 6,115,745 | A | * | 9/2000 | Berstis et al. | ............... 709/227 |
| 6,510,556 | B1 | * | 1/2003 | Kusaba et al. | ................. 725/93 |
| 2003/0050979 | A1 | * | 3/2003 | Takahashi | ................... 709/204 |
| 2008/0313261 | A1 | * | 12/2008 | Kouda | ........................ 709/201 |
| 2009/0132640 | A1 | * | 5/2009 | Verma et al. | ................. 709/203 |

FOREIGN PATENT DOCUMENTS

JP 9-231086 A 9/1997

* cited by examiner

*Primary Examiner*—Larry Donaghue
(74) *Attorney, Agent, or Firm*—Mattingly & Malur, P.C.

(57) ABSTRACT

An electronic-data distribution system includes a distribution server transmitting a distributed article of electronic data to a distribution client. The distribution client includes a distribution-information requesting means and a distribution requesting means. The distribution server includes a distributed-article creating means, a distribution-information transmitting means transmitting to the distribution client, at least a part of distribution information as a distribution plan stored in a distribution-information DB provided in the distribution server, and a distributing means for transmitting a distributed article for which a transmission request is made to the distribution client.

3 Claims, 10 Drawing Sheets

ELECTRONIC-DATA DISTRIBUTION SYSTEM

BACKGROUND OF THE INVENTION

1. Field of the Invention

The present invention relates to an electronic-data distribution system capable of distributing electronic data to a personal computer or the like required to be sent the electronic data while dispersing a load on a distribution server caused by the electronic-data distribution.

2. Description of the Related Art

In recent years, a variety of work such as document composition at an office or the like has been performed using an information device such as a PC (personal computer), and specifically, using a program installed in a PC or the like.

A program is frequently modified for an improvement or the like, and if modified, an operator needs to acquire the modified program and install it in a PC or the like. The program acquisition and installation is burdensome to the operator, and thus, there are known various arts of lightening such a work load.

For example, in order to lighten a work load imposed on the operator of a PC or the like when acquiring the modified program, a program distribution server is generally provided which distributes the modified program to a PC or the like over a network.

When the program distribution server distributes the modified program to a PC or the like, however, a load borne on the program distribution server and the network is known to be heavier as the number of PCs increases. Particularly, the recent Internet development prompts more and more distribution servers to distribute not only programs but also files, music data or the like (below generically called "electronic data") to a PC or the like, thereby greatly requiring that a load caused by the distribution should be dispersed.

In order to solve the problem, Japanese Patent Laid-Open Publication No. 9-231086 offers an art of managing the frequency in use of programs in a PC or the like and requesting a program distribution server to distribute only programs used with higher frequency after modified.

However, if the modified programs are, for example, electronic data involved in security or the like such as virus vaccine software and a virus pattern file, then the electronic data after modified needs distributing regardless of the height of frequency in use. Hence, the art according to Japanese Patent Laid-Open Publication No. 9-231086 cannot be applied to the electronic data which must be distributed.

DISCLOSURE OF THE INVENTION

In view of the present situation, it is an object of the present invention to provide an electronic-data distribution system capable of distributing electronic data to a personal computer or the like required to be sent the electronic data while dispersing a load on a distribution server caused by the electronic-data distribution.

In order to solve the above problems, the present invention offers the following configurations.

An electronic-data distribution system according to claim 1 of the present invention includes a distribution server transmitting a distributed article of electronic data and a distribution client receiving a distributed article connected communicably with the distribution server, in which: the distribution client includes a distribution-information requesting means for requesting the distribution server to transmit at least a part of a distribution plan and a distribution requesting means for requesting the distribution server to transmit a distributed article; the distribution server includes a distributed-article creating means for creating a distributed article of electronic data using electronic data as a distribution object, a distribution-information transmitting means for transmitting, to the distribution client, at least a part of distribution information as a distribution plan stored in a distribution-information database provided in the distribution server, and a distributing means for transmitting a distributed article for which a transmission request is made to the distribution client; the distributed-article creating means includes a means for acquiring distribution information based on input information including a distribution client, a distribution start date-and-time and a dispersion period inputted by an operator of the distribution server, a means for referring to the distribution information, acquiring electronic data from a storage provided in the distribution server and creating a distributed article of electronic data, and a means for setting the distribution information to each data item to create a distribution-information record and storing the distribution-information record in the distribution-information database; the distribution-information requesting means includes a means for transmitting a distribution-information transmission-request message to the distribution server, and a means for receiving distribution information from the distribution server, then setting a distribution request date-and-time and a failure number using the received distribution information to thereby create request information, and storing the request information in a request-information database provided in the distribution client; the distribution-information transmitting means includes a means for receiving a distribution-information transmission-request message from the distribution client, then referring to all distribution-information records of the distribution-information database in order, and deciding whether the distribution client which has transmitted the distribution-information transmission-request message is set as the distribution destination of each distribution-information record, a means for, if this distribution client is set as the distribution destination, then deciding whether the distribution situation of the distribution-information record to the distribution client is "not transmitted", and if it is "not transmitted", then deciding that the distribution client is a distribution target for a distributed article, and a means for, if the decision is made that this distribution client is a distribution target for a distributed article, then creating distribution information including a distributed-article ID and a dispersion period of the distribution-information record and transmitting the distribution information to the distribution client; the distribution requesting means includes a means for referring to all request-information records of the request-information database in order and comparing a system year, month, day and time of the distribution client at a processing time with a distribution request date-and-time, a means for, if the system year, month, day and time is equal to or after the distribution request date-and-time, then creating a distributed-article request message and transmitting the distributed-article request message to the distribution server, a means for receiving a distribution message from the distribution server and then referring to a distribution permission code included in the distribution message, a means for, if the distribution permission code is "distribution permitted", storing a distributed article included in the distribution message in a storage provided in the distribution client, and a means for deleting a record whose distributed-article ID coincides with a distributed-article ID included in the distribution message among the request-information records of the request-information database; and the distributing means includes a means for, if the distribution server receives a distributed-article request message from the distribution client, then deciding whether a requested distributed article is a distribution object, a means for, if the decision is made that the distributed article is a distribution object, then referring to a storage place of the distributed article and acquiring the distributed article, creating a distribution permission code indicating "distribution permitted", a distributed-article ID and a distribution message including the distributed article and transmitting the distribution permission code, the distributed-article ID and the distribution message to the distribution client, and a means for setting "transmitted" to the distribution situation of the distribution destination and updating the distribution-information record.

An electronic-data distribution system according to claim 2 of the present invention is provided in which in the electronic-data distribution system according to claim 1: the distributed-article creating means includes a means for, when creating the distribution-information record, instead of the distribution start date-and-time and dispersion period, referring to information inputted by an operator of the distribution server and setting a distribution start date, a distribution start/end time and a maximum distribution-device number; the distribution-information requesting means includes a means for setting a distribution request date-and-time included in a received distribution information to a distribution request date-and-time for request information; the distribution-information transmitting means includes a means for, if the decision is made that a distribution client is a distribution target for a distributed article, then calculating a distribution request date-and-time in such a way that the number of distribution clients as distribution targets on each distribution request date does not exceed the maximum distribution-device number and that a load dispersion is executed at a distribution start/end time of each distribution request date, a means for creating distribution information including a distributed-article ID of a distribution-information record and a calculated distribution request date-and-time and transmitting the distribution information to the distribution client, and a means for setting "planned" to the distribution situation of the distribution client and updating the distribution-information record; and the distributing means includes a means for, if a distribution client which has transmitted a distributed-article request message is set at a distribution destination, then deciding whether the distribution situation of a distribution-information record at the distribution destination is "planned", a means for, if it is "planned", then comparing a system year, month, day and time of a distribution server at a processing time with a distribution start date and a distribution start/end time, and a means for deciding on a distribution object if the system year, month and day is equal to or after the distribution start date and if the system time is equal to or after the start time and equal to or before the end time of the distribution start/end time.

An electronic-data distribution system according to claim 3 of the present invention is provided in which in the electronic-data distribution system according to claim 1: the distributed-article creating means includes a means for referring to information inputted by an operator of the distribution server and setting a distribution method instead of the distribution start date-and-time and dispersion period of the distribution-information record, a means for, if the distribution method is "distribute in one day", then further setting a distribution start date-and-time and a dispersion period, and a means for, if the distribution method is "distribute separately in days", then further setting a distribution start date, a distribution start/end time and a maximum distribution-device number; the distribution-information requesting means includes a means for, if a distribution method included in received distribution information is "distribute in one day", then referring to a dispersion period included in the received distribution information and determining a distribution request date-and-time, setting a distributed-article ID and a distribution request date-and-time included in the received distribution information, setting a failure number and creating a distribution request record, and on the other hand, if the distribution method included in received distribution information is "distribute separately in days", then setting a distribution request date-and-time, setting a distributed-article ID and a distribution request date-and-time included in the received distribution information, setting a failure number and creating a distribution request record; the distribution-information transmitting means includes a means for, if a distribution method for a distribution-information record is "distribute in one day", then deciding whether the distribution situation of the distribution client is "not transmitted", and if it is "not transmitted", then deciding that the distribution client is a distribution target for a distributed article, and a means for, if the distribution method is "distribute separately in days", then when the decision is made that the distribution client is a distribution target for a distributed article, calculating a distribution request date-and-time in such a way that the number of distribution clients as distribution targets on each distribution request date does not exceed the maximum distribution-device number and that a load dispersion is executed at a distribution start/end time of each distribution request date, a means for creating distribution information including a distributed-article ID of a distribution-information record and a calculated distribution request date-and-time and transmitting the distribution information to a distribution client, and a means for setting "planned" to the distribution situation of the distribution client and updating the distribution-information record; and the distributing means includes a means for, if a distribution method for a distribution-information record is "distribute in one day", then deciding whether a requested distributed article is a distribution object, a means for, if the decision is made that the distributed article is a distribution object, then referring to a storage place of the distributed article and acquiring the distributed article, creating a distribution permission code indicating "distribution permitted", a distributed-article ID and a distribution message including the distributed article and transmitting the distribution permission code, the distributed-article ID and the distribution message to the distribution client, and a means for setting "transmitted" to the distribution situation of the distribution destination and updating the distribution-information record, a means for, if the distribution method is "distribute separately in days", then deciding whether a distribution client which has transmitted a distributed-article request message is set at a distribution destination of the distribution-information record, a means for, if the distribution client is set at the distribution destination, then deciding whether the distribution situation of the distribution destination is "planned", a means for, if it is "planned", then comparing a system year, month, day and time of a distribution server at a processing time with a distribution start date and a distribution start/end time, and a means for deciding on a distribution object if the system year, month and day is equal to or after the distribution start date and if the system time is equal to or after the start time and equal to or before the end time of the distribution start/end time.

The electronic-data distribution system according to claim 1 of the present invention is capable of distributing electronic data to a personal computer or the like required to be sent the electronic data while dispersing a load on a distribution server caused by the electronic-data distribution.

The electronic-data distribution system according to claim 2 of the present invention is capable of, in addition to the advantage of claim 1, distributing electronic data to a relatively large number of distribution clients as distribution targets on dispersed days and thereby dispersing a load caused by the distribution.

The electronic-data distribution system according to claim 3 of the present invention is capable of, in addition to the advantage of claim 1, making an operator of a distribution server choose whether to distribute a distributed article in one day or separately in days when creating the distributed article and thereby choose the distribution method in consideration of a load on the distribution server caused by the electronic-data distribution.

DETAILED DESCRIPTION OF THE INVENTION

Embodiments of the present invention will be below described with reference to the drawings showing practical examples.

In the following description and drawings, information processed by a computer such as a program and a file is generically called "electronic data", and when a server sends electronic data to a client, "distribution" or "transmission" is described on each occasion because "distribution" is used only if transmitting a distributed article is expressed by one word, but otherwise "transmission" is used.

Figure 1:
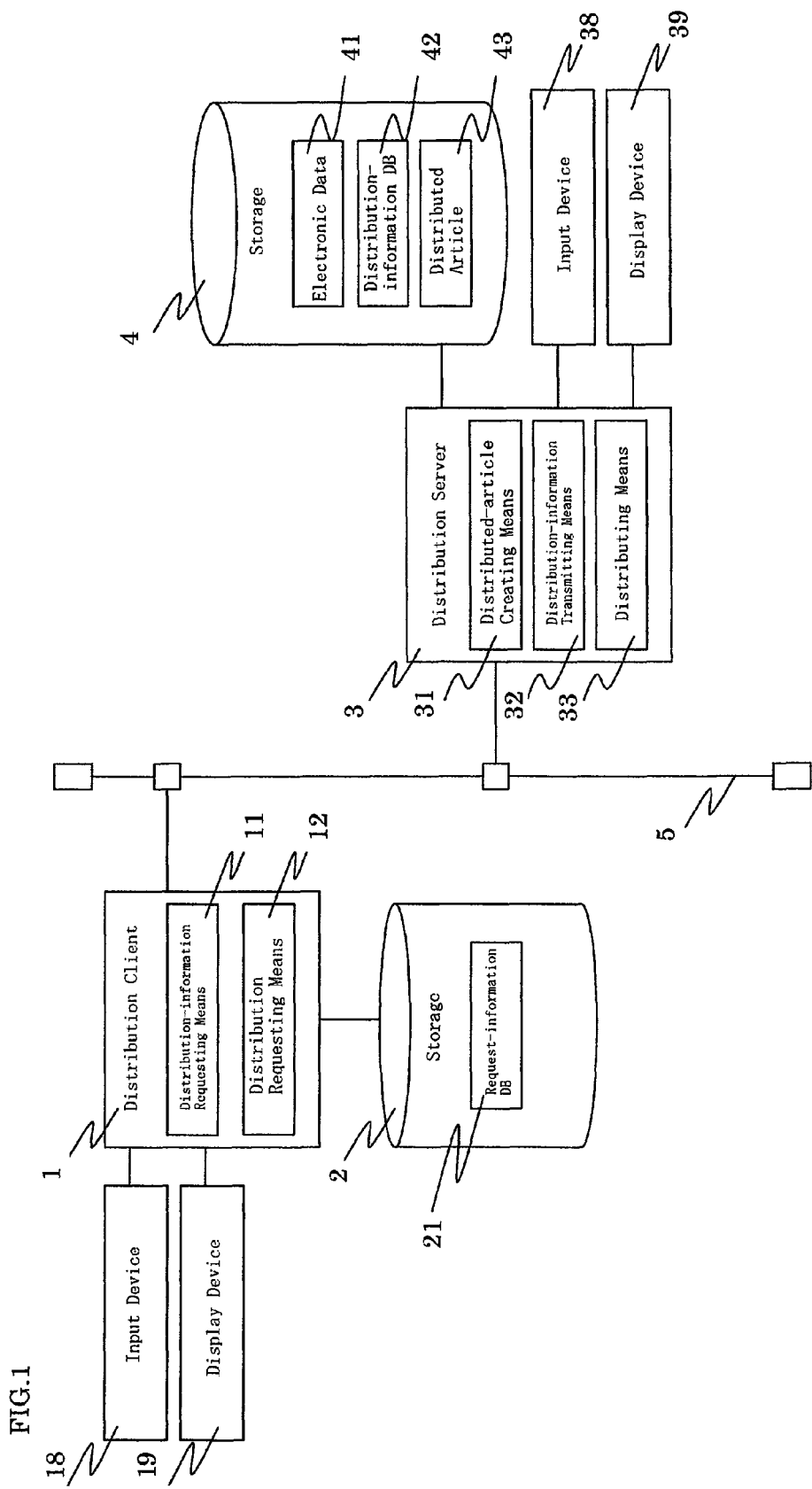
FIG. 1 is a block diagram showing an electronic-data distribution system according to a first embodiment of the present invention.

FIG. 1 is a block diagram showing an electronic-data distribution system according to a first embodiment of the present invention.

<Whole Configuration and Functions of Electronic-Data Distribution System>

The electronic-data distribution system is configured by connecting a distribution client 1 and a distribution server 3 communicably through a wired or radio communication line.

Although one device as each component element is shown in FIG. 1, two or more may be employed, and for example, two or more distribution clients 1 having the same configuration and functions are often connected, and two or more distribution server 3 having the same configuration and functions can also be connected to thereby disperse a load.

In FIG. 1, the distribution client 1 and the distribution server 3 are connected communicably with each other over a LAN (local area network) 5. The connection method is not limited to a LAN, as long as they are mutually communicably connected.

The whole electronic-data distribution system provided with the above configuration and functions (described later) of each device has functions as follows.

First, the distribution server 3 creates a distributed article (electronic data) to the distribution client 1 and makes a distribution plan for the distributed article.

Then, the distribution server 3 transmits at least a part of the distribution plan to the distribution client 1 at a predetermined point of time—when the distribution client 1 gives a login to the distribution server 3 or at such another.

On the basis of at least the part of the distribution plan from the distribution server 3, the distribution client 1 determines a point of time to receive the distributed article and requests the distribution server 3 to transmit the distributed article when the time reaches the point of time.

Upon receiving the request to transmit the distributed article from the distribution client 1, the distribution server 3 transmits the distributed article to the distribution client 1.

In this way, without immediately making the distribution request to the distribution server 3, the distribution client 1 first receives at least the part of the distribution plan, and based upon this, determines the point of time to request the distributed article. In other words, the distribution client 1 determines the point of time to request the distributed article in cooperation with the distribution server 3.

This is useful for example, in an in-house network system, for preventing all the distribution clients 1 from requesting distributions shortly after the beginning of working hours and thereby the distribution server 3 and the LAN 5 from bearing loads beyond throughput limits. In short, electronic data can be distributed while dispersing a load caused by the electronic-data distribution.

<Configuration and Functions of Each Device in Electronic-Data Distribution System>

Configurations and functions of the distribution client 1 and the distribution server 3 will be below described.

The distribution client 1 is a device such as a PC and connected communicably with a storage 2. The storage 2 is a device such as a magnetic disk and built in the distribution client 1 or externally connected. The storage 2 and a main storage (not shown) or the like of the distribution client 1 function as a storing means of the distribution client 1. In FIG. 1, only the single storage 2 is shown; two or more can be connected, however.

The storage 2 includes a request-information DB (database) 21 which stores information specifying a distributed article for which a transmission request is to be made to the distribution server 3, a time to make the transmission request, or the like.

The distribution client 1 is also connected communicably with an input device 18 and a display device 19. The input device 18 is a device such as a keyboard and a mouse, and an operator of the distribution client 1 operates the input device 18 to thereby give an instruction for a processing to be executed by the distribution client 1. The display device 19 is a liquid-crystal display, a printer or the like and displays a result or the like of the processing executed by the distribution client 1. In brief, the input device 18 and the display device 19 function as an inputting means and a displaying means of the distribution client 1, respectively.

The distribution client 1 includes a CPU (central processing unit) and a storage such as a main storage (not shown).

The CPU loads various programs (e.g., a distribution-information request program: not shown) stored in the storage 2 into the main storage and executes an instruction code thereof to thereby execute each processing.

Since the art of such program execution is generally known, in order to avoid complicating the explanation of the program execution in the following description and drawings, the distribution-information request program is described as a distribution-information requesting means 11 as if there were hardware for each program and as if each means executed a processing. In practice, each means (e.g., the distribution-information requesting means 11) can also be formed by hardware (such as an electronic device) or a combination of hardware and firmware.

The distribution client 1 includes the distribution-information requesting means 11 and a distribution requesting means (distribution request program) 12.

The distribution-information requesting means 11 is activated at a point of time when the distribution client 1 logs in for the distribution server 3 or at another such time (i.e., the CPU starts to execute an instruction code for the distribution-information request program) and requests the distribution server 3 to transmit at least a part of a distribution plan. On the basis of at least the received part of the distribution plan, it determines a time to request the distribution server 3 to transmit a distributed article or the like, and stores the time or the like, together with information specifying the distributed article for which the transmission request is to be made to the distribution server 3, in the request-information DB 21.

The distribution requesting means 12 is activated at the time to request the distribution server 3 to transmit the distributed article which is determined by the distribution-information requesting means 11 (i.e., the CPU starts to execute an instruction code for the distribution request program), requests the distribution server 3 to transmit the distributed article and stores the received distributed article in the storage 2.

The distribution server 3 is a device such as a PC and connected communicably with a storage 4. The storage 4 is a device such as a magnetic disk and built in the distribution server 3 or externally connected. The storage 4 and a main storage (not shown) or the like of the distribution server 3 function as a storing means of the distribution server 3. In FIG. 1, only the single storage 4 is shown; two or more can be connected, however.

The storage 4 includes a distribution-information DB 42 storing a distribution plan—information specifying a distributed article to be transmitted to the distribution client 1, the number of the distribution clients 1, information specifying each distribution client 1, a date-and-time to start a distribution or the like.

In addition to the above, the storage 4 has an electronic data 41 and a distributed article 43 in storage. The electronic data 41 is a term for expressing all kinds of electronic data such as a program and a file stored in the storage 4, and thus, does not mean a specific program or file. The distributed article 43 indicates, among the pieces of electronic data 41, electronic data created as a transmission target to the distribution client 1 by the distribution server 3.

The distribution server 3 is also connected communicably with an input device 38 and a display device 39. The input device 38 is a device such as a keyboard and a mouse, and an operator of the distribution server 3 operates the input device 38 to thereby give an instruction for a processing to be executed by the distribution server 3. The display device 39 is a liquid-crystal display, a printer or the like and displays a result or the like of the processing executed by the distribution server 3. In brief, the input device 38 and the display device 39 function as an inputting means and a displaying means of the distribution server 3, respectively.

The distribution server 3 includes a CPU and a storage such as a main storage (not shown).

In the same way as the distribution client 1, the CPU loads various programs (e.g., a distributed-article creation program: not shown) stored in the storage 4 into the main storage and executes an instruction code thereof to thereby execute each processing. Similarly to the distribution client 1, in order to avoid complicating the explanation of the program execution in the following description and drawings, the distributed-article creation program is described as a distributed-article creating means 31 as if there were hardware for each program and as if each means executed a processing. In practice, each means (e.g., the distributed-article creating means 31) can also be formed by hardware (such as an electronic device) or a combination of hardware and firmware.

The distribution server 3 includes the distributed-article creating means 31 (distributed-article creation program), a distribution-information transmitting means 32 (distribution-information transmission program) and a distributing means 33 (distribution program).

The distributed-article creating means 31 is activated when an operator of the distribution server 3 operates the input device 38 (i.e., the operator of the distribution server 3 inputs an activation command or the like in the input device 38 and the CPU receives it and starts to execute an instruction code for the distributed-article creation program), creates the distributed article 43 using the electronic data 41 as a distribution object designated through the operation of the input device 38 by the operator of the distribution server 3 and stores, in the distribution-information DB 42, information specifying the distribution client 1 to be given the distribution or the like which is designated through the operation of the input device 38 by the operator of the distribution server 3.

The distribution-information transmitting means 32 is activated at a point of time when the distribution server 3 receives a transmission request for at least a part of the distribution plan from the distribution client 1 (i.e., the CPU starts to execute an instruction code for the distribution-information transmission program) and transmits at least the part of the distribution plan stored in the distribution-information DB 42 to the distribution client 1.

The distributing means 33 is activated at a point of time when the distribution server 3 receives a transmission request for a distributed article from the distribution client 1 (i.e., the CPU starts to execute an instruction code for the distribution program) and transmits the distributed article 43 for which the transmission request is made to the distribution client 1.

Figure 2:
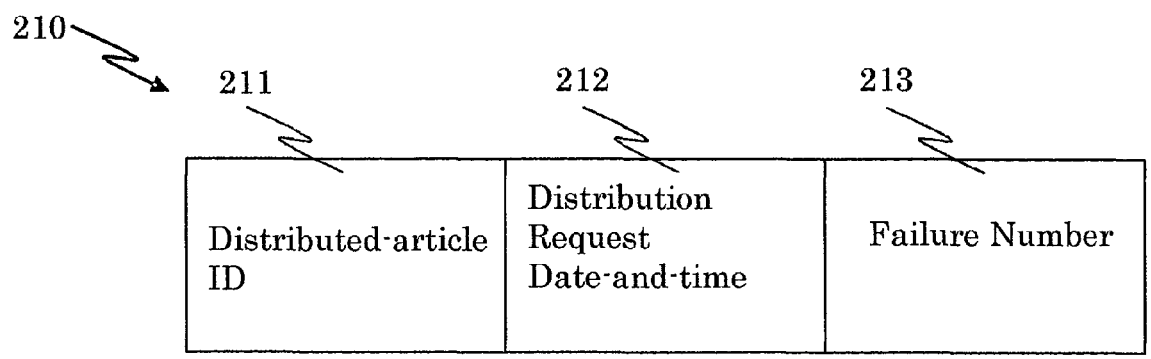
FIG. 2 is a block diagram showing a request-information database according to the present invention.

FIG. 2 is a block diagram showing the request-information DB 21.

The request-information DB 21 is composed of zero or more request-information records 210 (if there is no distributed article for which a transmission request is made, then the request-information record 210 does not exist and thus the number of records is zero).

The request-information record 210 is made up of three data items—a distributed-article ID 211, a distribution request date-and-time 212 and a failure number 213. The creation (addition), update, deletion or the like of the request-information record 210 is executed by a database managing means (program: not shown) such as MySQL (registered trademark) provided in the distribution client 1. The distribution-information requesting means 11, for example, using an SQL or the like, instructs the database managing means to create the request-information record 210.

The distributed-article ID 211 is an ID (identifier) for uniquely identifying the distributed article 43 which the distribution server 3 should be requested to transmit.

The distributed-article ID 211 is set to an ID for uniquely identifying the distributed article 43 which is transmitted as a part of the distribution plan to the distribution client 1 by the distribution-information transmitting means 32.

The distribution request date-and-time 212 has a date-and-time to request the distribution server 3 to transmit a distributed article, for example, "20080528131504" (May 28, 2008, 13:15:04). The distribution-information requesting means 11 sets a date-and-time determined by a method (described later) in the distribution request date-and-time 212.

The failure number 213 has the number of failures in a transmission request for a distributed article, and hence, zero is set at a point of time when the request-information record 210 is created and one is added every time the transmission request fails.

Figure 3:
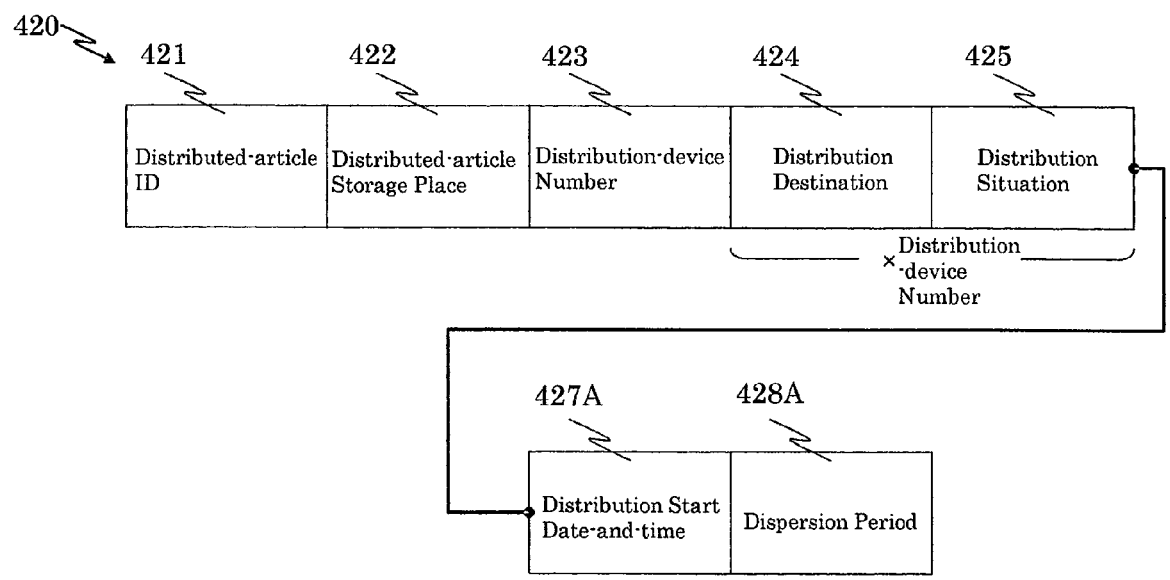
FIG. 3 is a block diagram showing a request-information database according to the present invention.

FIG. 3 is a block diagram showing the distribution-information DB 42.

The distribution-information DB 42 is composed of zero or more distribution-information records 420 (described as a "distribution plan" in the explanation of FIGS. 1 and 2: if there is no distributed article to be transmitted, then the distribution-information record 420 does not exist and thus the number of records is zero).

The distribution-information record 420 is made up of seven kinds of data items—a distributed-article ID 421, a distributed-article storage place 422, a distribution-device number 423, a distribution destination 424, a distribution situation 425, a distribution start date-and-time 427A and a dispersion period 428A. The creation (addition), update, deletion or the like of the distribution-information record 420 is executed in the same way as the request-information record 210 by a database managing means (program) provided in the distribution server 3. The distributed-article creating means 31, for example, using an SQL or the like, instructs the database managing means to create the distribution-information record 420.

The distributed-article ID 421 is an ID for uniquely identifying the distributed article 43 to be transmitted to the distribution client 1. The distributed-article creating means 31 produces an ID for uniquely identifying the distributed article 43 or does such another when creating the distributed article 43 and sets it in the distributed-article ID 421. Specifically, for example, a counter (not shown) having an initial value of one may be stored in the storage 4 and one can be added in sequence—"0001", "0002", "0003"—simultaneously every time the distribution-information record 420 is created.

The distributed-article storage place 422 has a place for storing the distributed article 43, and specifically, the distributed-article creating means 31 sets, for example, an absolute path of the distributed article 43.

The distribution-device number 423 has the number of the distribution clients 1 to which the distributed article 43 should be transmitted. The distribution destination 424 and the distribution situation 425 each have the same number as the distribution-device number 423 and have the place (e.g., IP address) on the LAN 5 of each distribution client 1 and the distribution situations of the distributed article 43, respectively.

More specifically, an operator of the distribution server 3 designates the distribution client 1 to which the distributed article 43 is transmitted when creating this distributed article 43, and the distributed-article creating means 31 sets the IP address or the like of the designated distribution client 1 in the distribution destination 424 and sets a value indicating "not transmitted" (below called simply "not transmitted") in the distribution situation 425.

Further, the set number of the distribution destinations 424 (i.e., the number of the distribution clients 1 set by the operator of the distribution server 3) is set in the distribution-device number 423.

The distributing means 33 updates the set value of the distribution situation 425 to "transmitted".

The distribution start date-and-time 427A has a date-and-time to start transmitting the distributed article 43, for example, "20080528090000" (May 28, 2008, 09:00:00).

An operator of the distribution server 3 designates a distribution start date-and-time when creating the distributed article 43, and the distributed-article creating means 31 sets the designated date-and-time in the distribution start date-and-time 427A.

The dispersion period 428A has a time interval, for example, "023000" (two hours, thirty minutes and zero seconds). As described later, the distribution-information requesting means 11 receives the dispersion period 428A as a part of the distribution plan from the distribution server 3, referring to the dispersion period 428A and determines a date-and-time to receive the distributed article 43. An operator of the distribution server 3 designates a dispersion period when creating the distributed article 43, and the distributed-article creating means 31 sets the designated dispersion period in the dispersion period 428A.

Hereinbefore, the configuration and functions of the electronic-data distribution system have been described, and a detailed operation of the electronic-data distribution system will be below described from the creation of a distributed article to the distribution thereof in that order.

Figure 4:
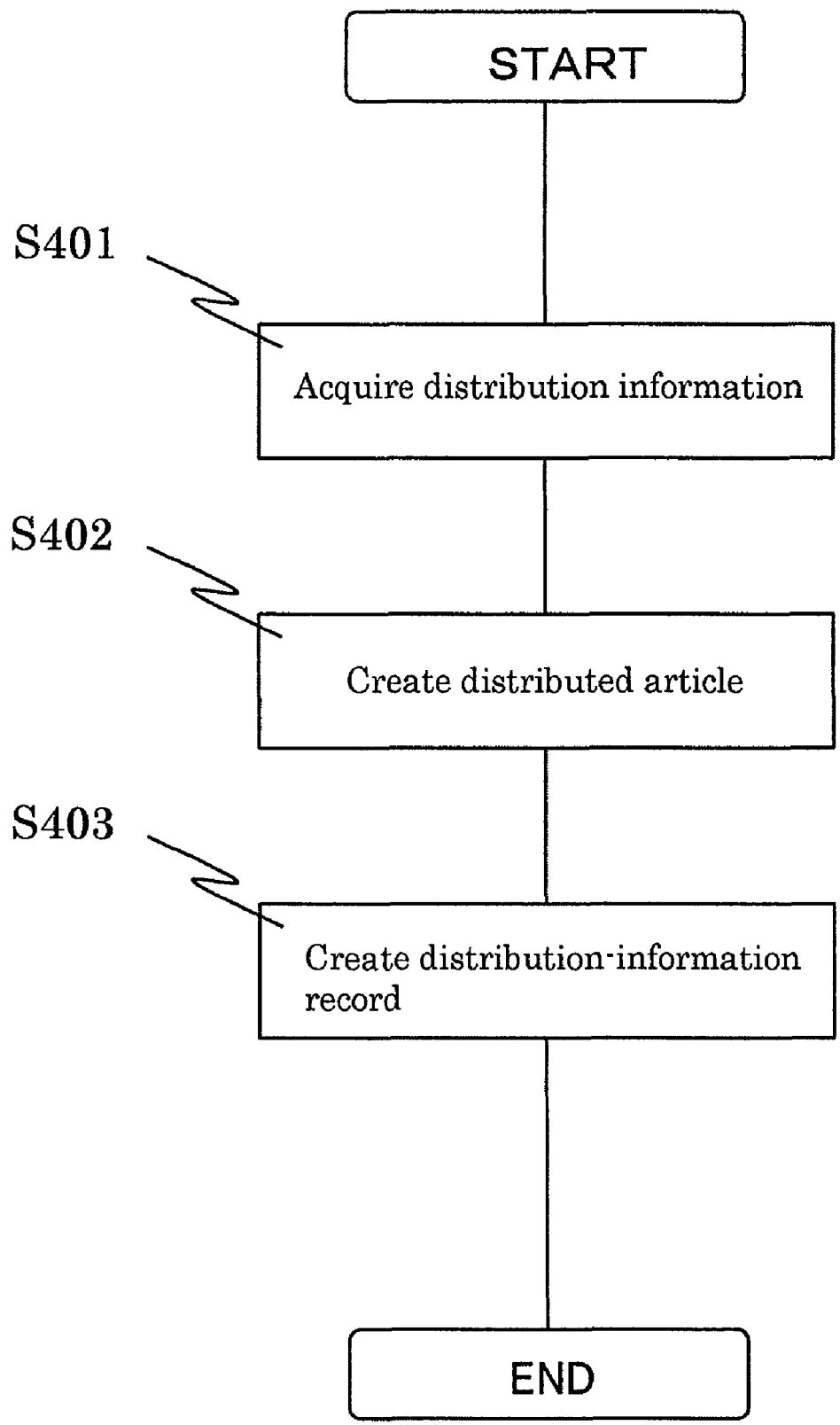
FIG. 4 is a flow chart showing an operation of a distributed-article creating means according to the present invention.

FIG. 4 is a flow chart showing an operation of the distributed-article creating means 31.

In order to create a distributed article, an operator of the distribution server 3 operates the input device 38 to thereby activate the distributed-article creating means 31.

The distributed-article creating means 31 acquires distribution information after activated (S401).

In further detail, for example, the distributed-article creating means 31 displays a distribution-information input-request image in the display device 39. The operator of the distribution server 3 operates the input device 38 to thereby input a storage place of the electronic data 41 as a distribution object (e.g., an absolute path of the electronic data 41), a storage place for creating the distributed article 43 (e.g., an absolute path of the distributed article 43), information for designating the distribution client 1 as a transmission destination (e.g., the ID of the distribution client 1 stored beforehand in the storage 4 corresponding to the IP address of the distribution client 1), a date-and-time to start the distribution and a dispersion period. Then, the distributed-article creating means 31 acquires the inputted distribution information.

Next, the distributed-article creating means 31 refers to the inputted distribution information and creates a distributed article (S402).

In further detail, for example, the distributed-article creating means 31 refers to the storage place of the electronic data 41 as a distribution object and copies the electronic data 41 in the storage place for creating the distributed article 43. It may not only copy it, for example, but also create an installer (program) of the electronic data 41 and store it in the storage place for creating the distributed article 43. Further, if two or more are inputted as the storage place of the electronic data 41 as a distribution object, it may also create the electronic data 41 or an installer of the electronic data 41 by collecting and compressing it into a single file using a ZIP or the like and store it in the storage place for creating the distributed article 43.

Sequentially, the distributed-article creating means 31 creates the distribution-information record 420 (S403).

In further detail, for example, the distributed-article creating means 31 creates an ID for specifying the created distributed article 43 and sets it in the distributed-article ID 421. Then, it refers to the inputted distribution information and sets the storage place for creating the distributed article 43 in the distributed-article storage place 422, the number of the distribution clients 1 as transmission destinations in the distribution-device number 423, the distribution clients 1 as transmission destinations in the distribution destination 424, the date-and-time to start the distribution in the distribution start date-and-time 427A and the dispersion period in the dispersion period 428A, and sets "not transmitted" in the distribution situation 425.

In this way, the inputted information is set in each data item of the distribution-information record 420. However, for example, a value to be set in the dispersion period 428A may be calculated using the inputted information.

Specifically, a processing time taken to transmit the distributed article 43 to the distribution clients 1 is calculated based upon a data size or the like thereof, and on the basis of a model in which a distribution request from each distribution client 1 occurs at random during the dispersion period 428A, the dispersion period 428A may be calculated in such a way that the duty factor of the distribution server 3 and the LAN 5 is equal to or lower than a predetermined value (e.g., 30%). The above methods are merely illustrations and a value suitable as the dispersion period 428A can be calculated in a variety of statistical methods.

Hence, the distributed-article creating means 31 calculates the dispersion period 428A, thereby saving an operator of the distribution server 3 from determining and inputting a dispersion period to lighten the burden imposed on the operator. However, since a value calculated by the distributed-article creating means 31 is on some premise about the distribution of distribution-request occurrence from each distribution client 1, the value is not always guaranteed appropriate, and in some cases, it is more appropriate that an operator of the distribution server 3 determines and inputs a dispersion period based upon an empirical value. Accordingly, it is more desirable to offer a choice as to whether the distributed-article creating means 31 calculates the dispersion period 428A or an operator of the distribution server 3 determines and inputs a dispersion period.

Upon creating the distribution-information record 420, the distributed-article creating means 31 ends the processing.

Figure 5:
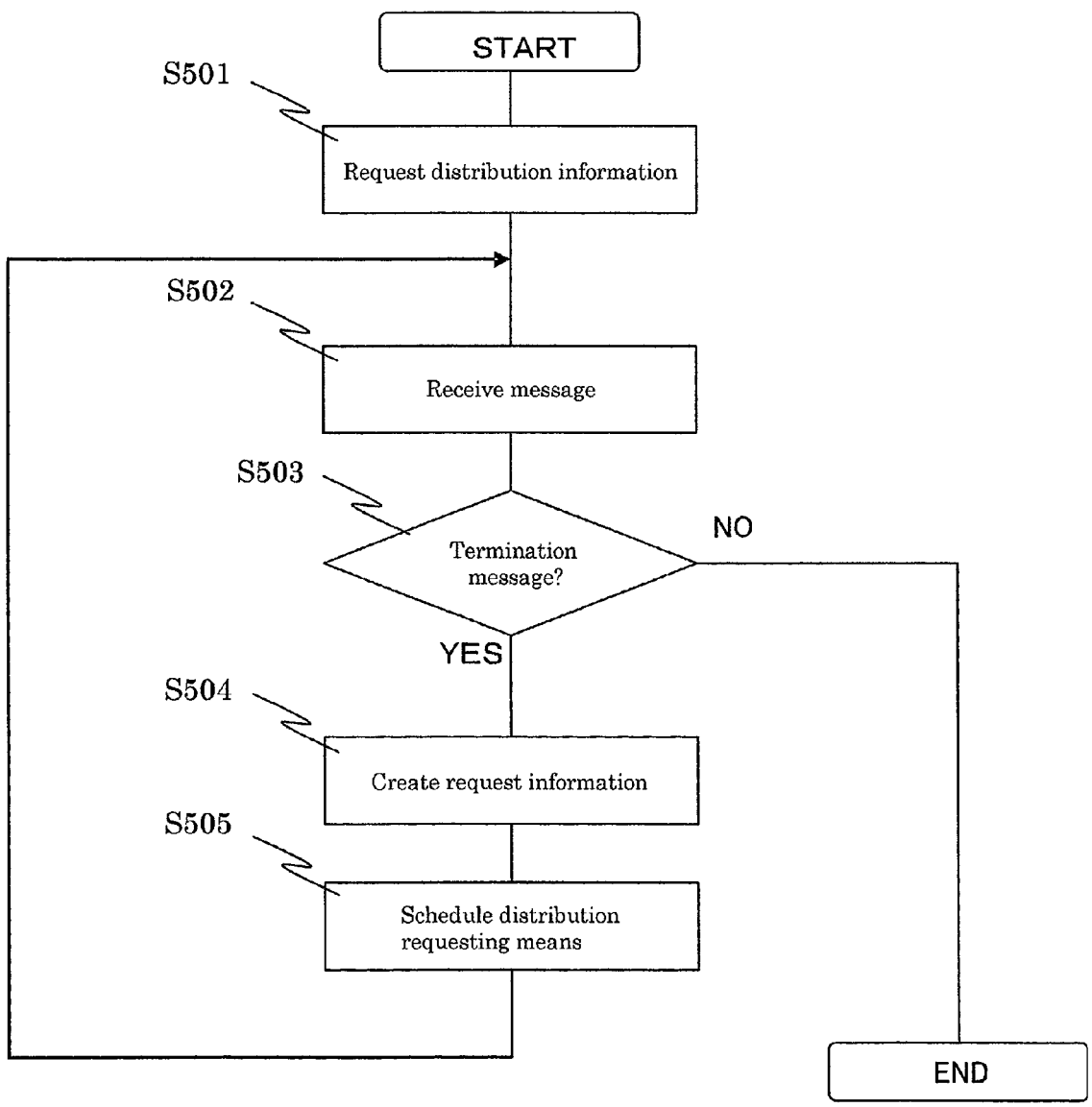
FIG. 5 is a flow chart showing an operation of a distribution-information requesting means according to the present invention.

FIG. 5 is a flow chart showing an operation of the distribution-information requesting means 11.

Whenever necessary, an operator of the distribution client 1 operates the input device 18 to activate the distribution-information requesting means 11. Alternatively, instead of an operation by the operator of the distribution client 1 or in addition to the operation, an OS (operating system) of the distribution client 1 may request a login for the distribution server 3 and activate the distribution-information requesting means 11 at a point of time when the distribution client 1 is activated. This makes it possible for the operator of the distribution client 1 to verify whether there is a distributed article without taking any particular notice every time the distribution client 1 is activated.

After activated, the distribution-information requesting means 11 transmits a distribution-information transmission-request message to the distribution server 3 (S501).

Next, the distribution-information requesting means 11 waits for the distribution server 3 to transmit the message and receives the transmitted message (S502), and if the received message is a termination message (YES at S503), it ends the processing.

If the received message is not the termination message (NO at S503), the received message includes at least a part of the data items of the distribution-information record 420, and then, the distribution-information requesting means 11 creates request information using the received message (S504).

In further detail, it refers to the dispersion period 428A included in the received message and executes a random-number processing or the like to thereby calculate a value equal to or more than zero and equal to or less than the dispersion period 428A. The time when the calculate value elapses from the system year, month, day and time of the distribution client 1 at the processing time is set as a distribution request date-and-time. For example, if the system year, month, day and time is May 28, 2008, 09:10:05, the dispersion period 428A is two hours and the calculate value is one hour and fifteen minutes, then the distribution request date-and-time is May 28, 2008, 10:25:05 when one hour and fifteen minutes pass from May 28, 2008, 09:10:05.

However, unless the time of a clock provided in the distribution client 1 is exactly the same as the time of a clock provided in the distribution server 3, a value shorter than one minute or the like is not very meaningful, and in such a case, a value may be rounded up, down or off below a predetermined unit of one minute, ten minutes or the like.

The distribution-information requesting means 11 sets the distributed-article ID 421 included in the received message in the distributed-article ID 211, the thus calculated distribution request date-and-time in the distribution request date-and-time 212 and zero in the failure number 213 to thereby create the request-information record 210.

Sequentially, the distribution-information requesting means 11 schedules the distribution requesting means 12 to be activated at the distribution request date-and-time (S505), and waits again for the distribution server 3 to transmit a message (S502).

Figure 6:
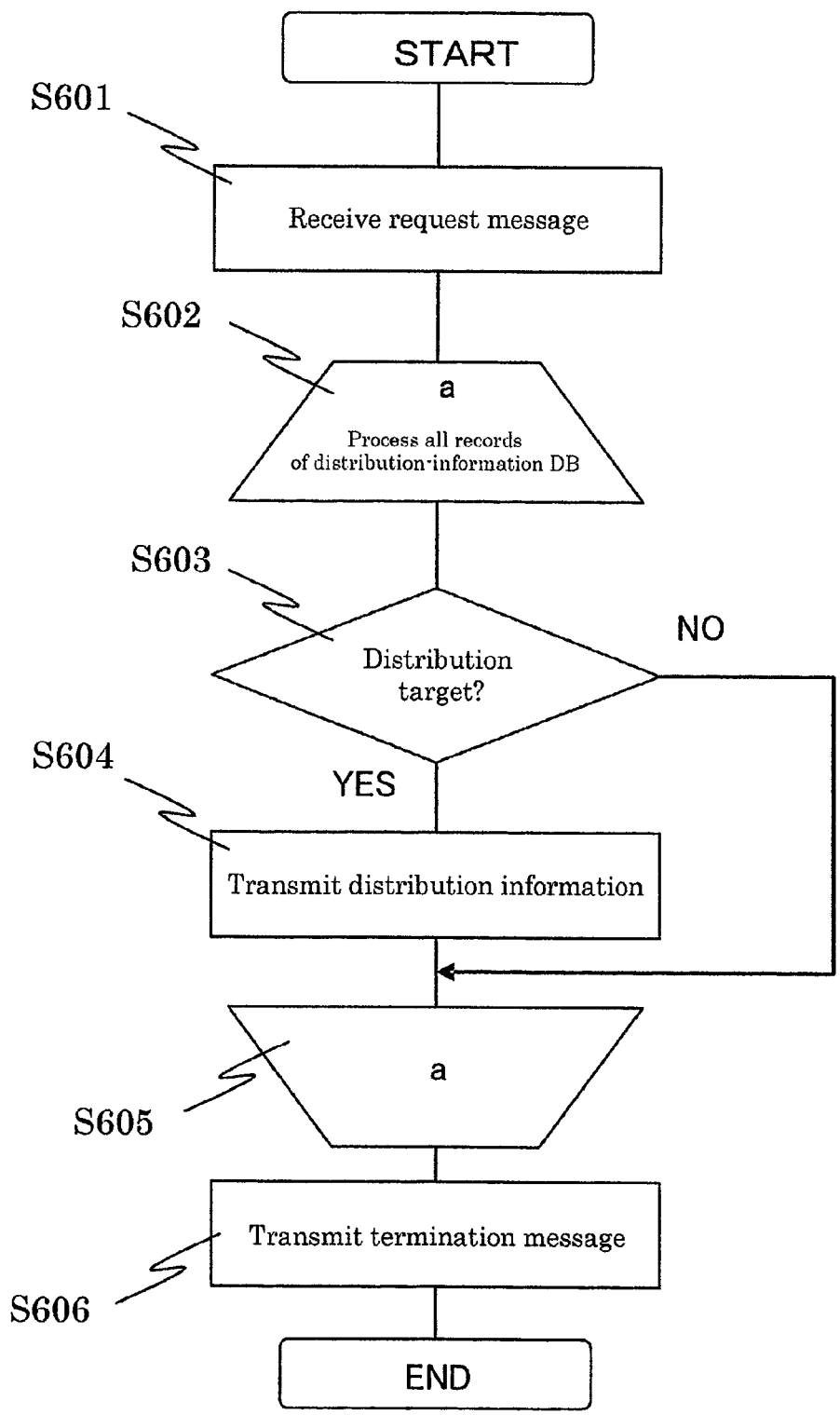
FIG. 6 is a flow chart showing an operation of a distribution-information transmitting means according to the present invention.

FIG. 6 is a flow chart showing an operation of the distribution-information transmitting means 32.

The distribution-information transmitting means 32 is activated when the distribution server 3 receives a distribution-information transmission-request message from the distribution-information requesting means 11.

After activated, the distribution-information transmitting means 32 first receives the distribution-information transmission-request message (S601).

Next, the distribution-information transmitting means 32 refers to all the distribution-information records 420 of the distribution-information DB 42 in order and executes the following processing (S602 to S605).

The distribution-information transmitting means 32 decides whether the distribution client 1 which has transmitted the distribution-information transmission-request message is a distribution target (S603).

In further detail, first, it decides whether the system year, month, day and time of the distribution server 3 at the processing time is equal to or after the distribution start date-and-time 427A of the distribution-information record 420. If the system year, month, day and time is before the distribution start date-and-time 427A, it decides that the distribution client 1 is a distribution target, while if it is equal to or after the distribution start date-and-time 427A, it decides whether the distribution client 1 which has transmitted the distribution-information transmission-request message is set as the distribution destination 424 of the distribution-information record 420.

If an IP address of the distribution client 1 is set in the distribution destination 424, it can be compared with an IP address of the transmission origin of the distribution-information transmission-request message. Unless it is set, the decision is made that it is not a distribution target. On the other hand, if it is set, it further decides whether the distribution situation 425 of the distribution client 1 is "not transmitted", and if it is "not transmitted", it decides that the distribution client 1 is a distribution target of the distributed article 43 while unless it is "not transmitted", it decides that it is not the distribution target (S603).

If the distribution-information transmitting means 32 decides that the distribution client 1 is a distribution target of the distributed article 43 (YES at S603), it creates a message (distribution information) including the distributed-article ID 421 and the dispersion period 428A of the distribution-information record 420 and transmits them to the distribution client 1 (S604).

On the other hand, if the distribution-information transmitting means 32 decides that the distribution client 1 is not a distribution target of the distributed article 43 (NO at S603), it refers to the next distribution-information record 420.

The distribution-information transmitting means 32 refers to all the distribution-information records 420 of the distribution-information DB 42 in order, executes the processing of S602 to S605, and thereafter transmits a termination message to the distribution client 1 (S606) to end the processing.

Figure 7:
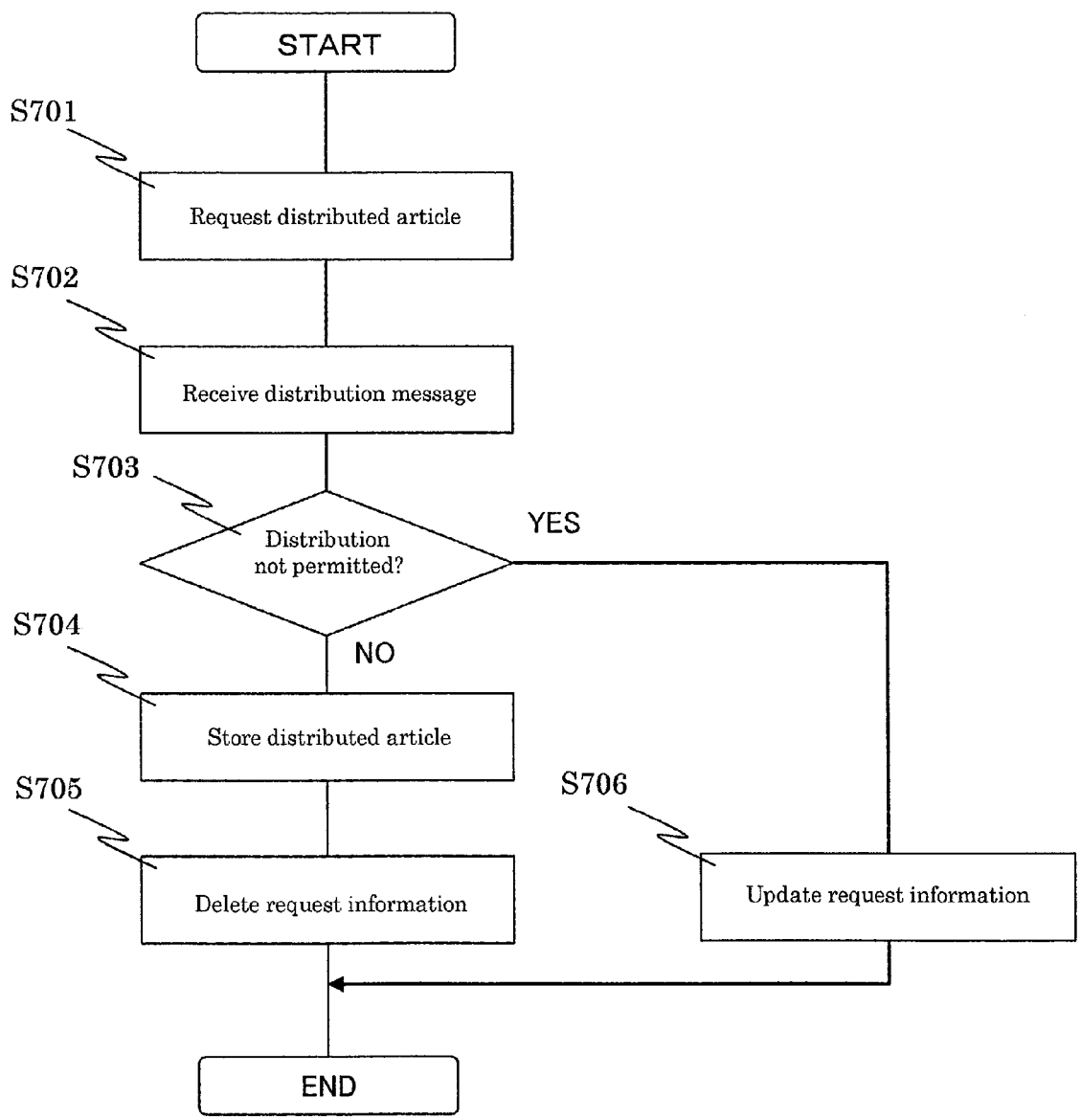
FIG. 7 is a flow chart showing an operation of a distribution requesting means according to the present invention.

FIG. 7 is a flow chart showing an operation of the distribution requesting means 12.

The distribution requesting means 12 is activated by an OS of the distribution client 1 at a predetermined time scheduled by the distribution-information requesting means 11 in S505. However, instead of this daemon processing, for example, the following may be executed—the distribution-information requesting means 11 stores the scheduled predetermined time in a main storage or the storage 2, the OS activates the distribution requesting means 12 when the distribution client 1 is activated, the distribution requesting means 12 decides at a predetermined interval whether the time has reached the predetermined time stored in the main storage or the storage 2, and if it has reached the predetermined time, executes the following processing (S701 to S704).

After activated, the distribution requesting means 12 transmits a distributed-article request message to the distribution server 3 (S701).

In further detail, the distribution requesting means 12 refers to all the request-information records 210 of the request-information DB 21 in order and compares the system year, month, day and time of the distribution client 1 at the processing time with the distribution request date-and-time 212. If the system year, month, day and time is equal to or after the distribution request date-and-time 212, it creates a distributed-article request message including the distributed-article ID 211 and transmits it to the distribution server 3.

Next, the distribution requesting means 12 continues waiting until receiving a distribution message from the distribution server 3 (S702). Upon receiving the distribution message, it refers to a distribution permission code included in the distribution message (S703). If the distribution permission code is "distribution permitted" (NO at S703), it executes the following processing (S704 and S705).

The distribution requesting means 12 stores the distributed article 43 included in the distribution message in the storage 2 (S704). An operator of the distribution client 1 uses the distributed article 43 stored in the storage 2 for installation or the like.

Sequentially, the distribution requesting means 12 deletes a record whose distributed-article ID 211 coincides with the distributed-article ID 421 included in the distribution message among the request-information records 210 of the request-information DB 21 (S705).

On the other hand, if the distribution permission code is "distribution not permitted" (YES at S703), the distribution requesting means 12 adds one to the failure number 213 of a record whose distributed-article ID 211 coincides with the distributed-article ID 421 included in the distribution message among the request-information records 210 of the request-information DB 21 (S706).

Through the above processing, the request-information record 210 to which a distributed article has been distributed is deleted while the request-information record 210 to which a distributed article has failed to be distributed is given an increment in the failure number 213 without being deleted.

This makes it possible for an operator of the distribution client 1 to display the contents of the request-information record 210 on a list or do such another in the display device 19 using a database managing means or the like and thereby to become aware of how many times a specified distributed article has failed to be distributed or the like.

In S701, in some cases, a distributed-article request message for a plurality of the request-information records 210 is transmitted to the distribution server 3. In those cases, the processing of S702 to S706 may be executed for each transmission, for example, the processing of S702 to S706 may be separated into threads to execute the threads for each transmission.

Conversely in S701, in some cases, no distributed-article request message for the request-information record 210 is transmitted to the distribution server 3, and in such cases, the processing may be terminated without executing the processing of S702 to S706.

Figure 8:
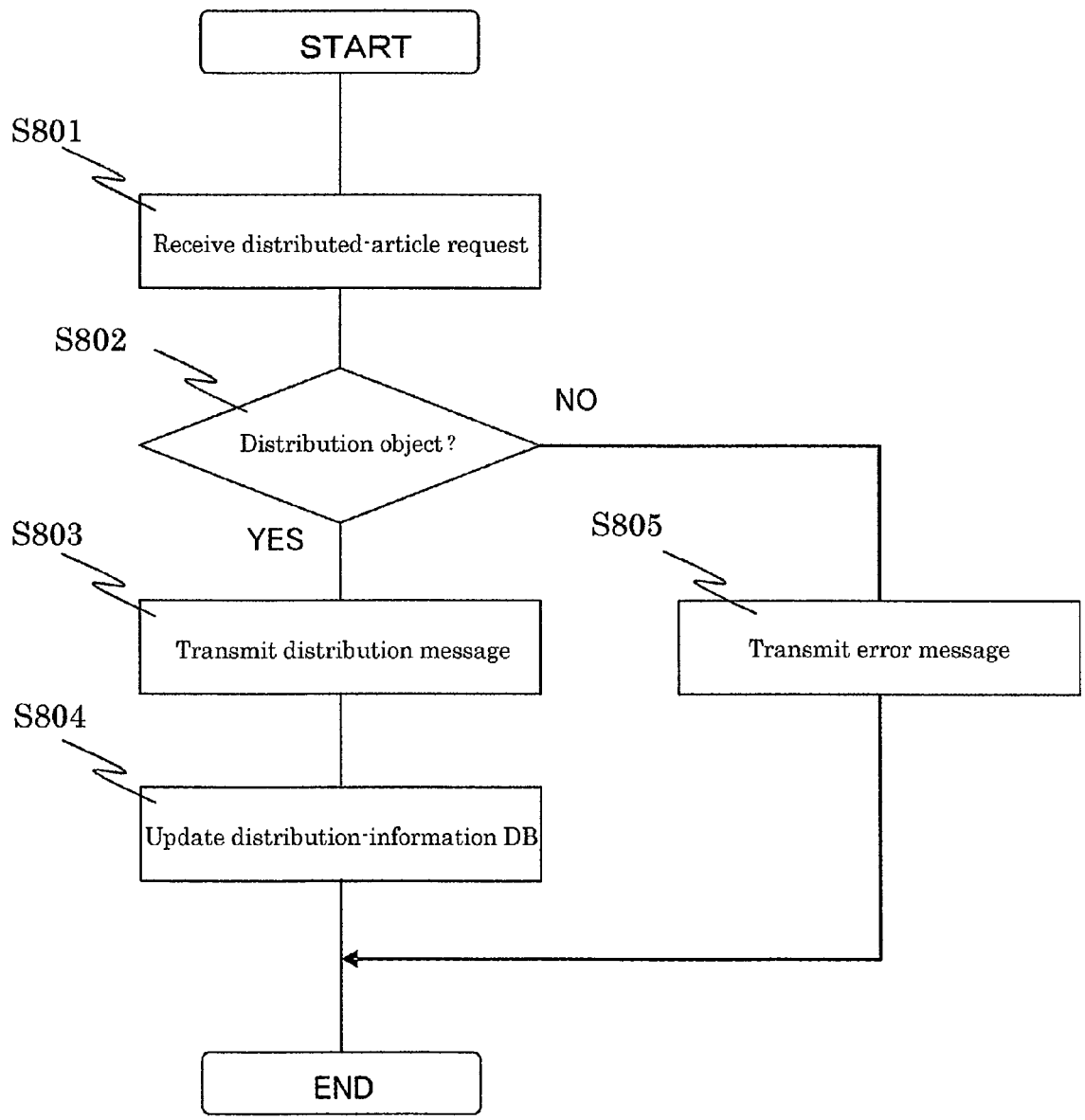
FIG. 8 is a flow chart showing an operation of a distributing means according to the present invention.

FIG. 8 is a flow chart showing an operation of the distributing means 33.

The distributing means 33 is activated when the distribution server 3 receives a distributed-article request message from the distribution requesting means 12.

After activated, the distributing means 33 first receives the distributed-article request message (S801).

Next, the distributing means 33 decides whether the requested distributed article is a distribution object (S802).

In further detail, it refers to a record whose distributed-article ID 421 coincides with the distributed-article ID 211 included in the distributed-article request message among the distribution-information records 420 and thereby makes a decision as follows.

The distributing means 33 decides whether the distribution client 1 which has transmitted the distributed-article request message is set in the distribution destination 424 (e.g., an IP address of the transmission origin of the distributed-article request message is set in the distribution destination 424). Unless it is set, the distributed article is not regarded as a distribution object while if it is set, it decides whether the distribution situation 425 at the distribution destination 424 is "not transmitted". Unless it is "not transmitted" (if "transmitted"), it is not regarded as a distribution object.

On the other hand, if it is "not transmitted", it compares the system year, month, day and time of the distribution server 3 at the processing time with the distribution start date-and-time 427A. If the system year, month, day and time is equal to or after the distribution start date-and-time 427A, it is regarded as a distribution object. Even if the system year, month, day and time is before the distribution start date-and-time 427A, then the distributed article is regarded as a distribution object as long as the time interval from the system year, month, day and time to the distribution start date-and-time 427A is equal to or less than a predetermined value (e.g. ten minutes), while it is not regarded as a distribution object if the time interval is more than the predetermined value. According to this processing, even if the clock of the distribution client 1 is, for example, five minutes faster than the clock of the distribution server 3 and a distributed-article request message is transmitted after two minutes from the distribution start date-and-time 427A with respect to the clock of the distribution client 1 (before three minutes from the distribution start date-and-time 427A with respect to the clock of the distribution server 3), then it can be regarded as a distribution object, thereby preventing the discrepancy in time between the clocks from causing a failure in the distributed-article request message.

Through the above processing, if deciding that it is a distribution object (YES at S802), the distributing means 33 refers to the distributed-article storage place 422, acquires the distributed article 43, creates a distribution message including a distribution permission code set as "distribution permitted", the distributed-article ID 421 and the distributed article 43 and transmits it to the distribution client 1 (S803).

Next, the distributing means 33 sets "transmitted" in the distribution situation 425 at the distribution destination 424 to update the distribution-information record 420 (S804).

On the other hand, if deciding that it is not a distribution object (NO at S802), the distributing means 33 creates an error message including a distribution permission code set as "distribution not permitted" and the distributed-article ID 421 and transmit sit to the distribution client 1 (S805).

Upon completing the above processing, the distributing means 33 ends the processing.

In the above processing, the distribution situation 425 at the distribution destination 424 to which a distributed article has been distributed is updated to "transmitted".

This makes it possible for an operator of the distribution server 3 to display the contents of the distribution-information record 420 on a list or do such another in the display device 39 using a database managing means or the like and thereby to become aware of whether each distributed article has been distributed to which distribution client 1 or the like.

In the above description, there is no processing for deleting the distribution-information record 420, but for example, a program for deleting the distribution-information record 420 in which all the distribution situations 425 are "transmitted" can be created and periodically activated, thereby deleting the unnecessary distribution-information record 420.

Next, a second embodiment of the present invention will be described.

Although the whole configuration of an electronic-data distribution system according to the second embodiment is the same as that of FIG. 1, the second embodiment differs in the data configuration of the distribution-information DB 42 from the first embodiment. Further, a part of the operations of the distribution-information requesting means 11, the distributed-article creating means 31, the distribution-information transmitting means 32 and the distributing means 33 is different from the first embodiment, though an operation of the distribution requesting means 12 is the same as the first embodiment.

The second embodiment will be below described by focusing different points thereof from the first embodiment.

Figure 9:
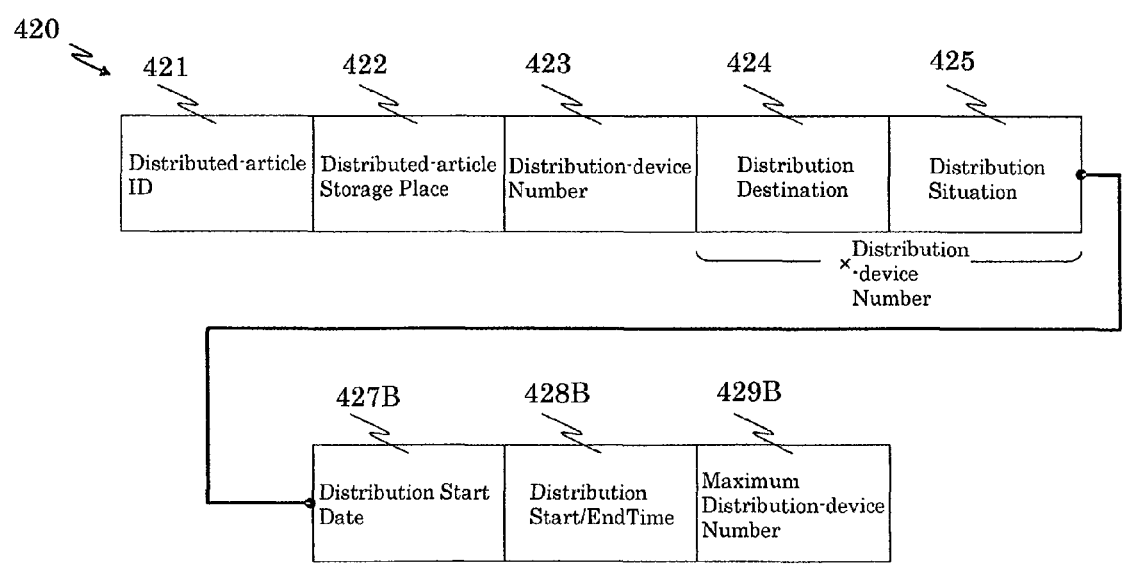
FIG. 9 is a block diagram showing an electronic-data distribution system according to a second embodiment of the present invention.

FIG. 9 is a block diagram showing a distribution-information DB 42 according to the second embodiment.

A distribution-information record 420 is made up of eight kinds of data items—a distributed-article ID 421, a distributed-article storage place 422, a distribution-device number 423, a distribution destination 424, a distribution situation 425, a distribution start date 427B, a distribution start/end time 428B and a maximum distribution-device number 429B.

Among the data items, the distributed-article ID 421, the distributed-article storage place 422, the distribution-device number 423 and the distribution destination 424 have values similar to the first embodiment.

The distribution situation 425 has "not transmitted" and "transmitted", and further in some cases, "planned". Specifically, in the same way as the first embodiment, the distributed-article creating means 31 sets "not transmitted" when an operator of the distribution server 3 creates the distributed article 43. Upon transmitting at least a part of the distribution plan to the distribution client 1, differently from the first embodiment, the distribution-information transmitting means 32 sets "planned" in the distribution situation 425 of the distribution client 1. Further, upon transmitting the distributed article 43 to the distribution client 1, in the same way as the first embodiment, the distributing means 33 sets "transmitted" in the distribution situation 425 of the distribution client 1.

The distribution start date-and-time 427A and the dispersion period 428A of the data items according to the first embodiment are replaced, in the second embodiment, with the distribution start date 427B, the distribution start/end time 428B and the maximum distribution-device number 429B.

The distribution start date 427B has a date to start transmitting the distributed article 43, for example, "20080528" (May 28, 2008). An operator of the distribution server 3 designates a distribution start date when creating the distributed article 43 and the distributed-article creating means 31 sets the designated date in the distribution start date 427B.

The distribution start/end time 428B has a time range in the 24-hour system for transmitting the distributed article 43, for example, "0830:1300" (from 08:30 to 13:00). An operator of the distribution server 3 designates a distribution start/end time when creating the distributed article 43 and the distributed-article creating means 31 sets the designated distribution start/end time in the distribution start/end time 428B.

The maximum distribution-device number 429B has a maximum number of the distribution clients 1 to which a distribution can be executed within one distribution time range, for example, "1000" (1000 devices). In the above example, the distributed article 43 can be transmitted to the 1000 distribution clients 1 at the maximum every day within the time range set in the distribution start/end time 428B on and after the distribution start date 427B. An operator of the distribution server 3 designates a maximum distribution-device number when creating the distributed article 43 and the distributed-article creating means 31 sets the designated maximum distribution-device number in the maximum distribution-device number 429B.

Next, each operation of the distributed-article creating means 31, the distribution-information requesting means 11, the distribution-information transmitting means 32 and the distributing means 33 will be described in this order by focusing different points thereof from the first embodiment.

FIG. 4 is a flow chart showing an operation of the distributed-article creating means 31.

In the same way as the first embodiment, the distributed-article creating means 31 acquires distribution information (S401), creates a distributed article (S402), and thereafter, creates the distribution-information record 420 (S403).

Although the contents of a processing for creating the distribution-information record 420 are also basically the same as the first embodiment, among the data items of the distribution-information record 420, the distribution start date-and-time 427A and the dispersion period 428A are not provided and set in the second embodiment. On the other hand, the distribution start date 427B, the distribution start/end time 428B and the maximum distribution-device number 429B not provided in the first embodiment are set here.

Specifically, the distributed-article creating means 31 refers to inputted information and sets a date to start a distribution in the distribution start date 427B, a distribution start/end time in the distribution start/end time 428B and a maximum distribution-device number in the maximum distribution-device number 429B.

Upon creating the distribution-information record 420, the distributed-article creating means 31 ends the processing.

FIG. 5 is a flow chart showing an operation of the distribution-information requesting means 11.

In the same way as the first embodiment, the distribution-information requesting means 11 executes a distribution-information request (S501), a message reception (S502) and a termination-message decision (S503). If the received message is not a termination message (NO at S503), then creates request information using the received message (S504).

In further detail, the distribution-information requesting means 11 sets the distributed-article ID 421 included in the received message in the distributed-article ID 211, a distribution request date-and-time included in the received message in the distribution request date-and-time 212 and zero in the failure number 213 to thereby create the distribution request record 210.

In the second embodiment, as described later, the distribution-information transmitting means 32 calculates a distribution request date-and-time, creates a message including the distribution request date-and-time and transmits it to the distribution clients 1. Hence, the distribution-information requesting means 11 sets a distribution request date-and-time included in the received message in the distribution request date-and-time 212, which is different from the first embodiment in which it refers to the dispersion period 428A included in the received message and calculates a distribution request date-and-time.

Next, the distribution-information requesting means 11 schedules the distribution requesting means 12 to be activated at the distribution request date-and-time (S505), and waits again for the distribution server 3 to transmit a message (S502).

FIG. 6 is a flow chart showing an operation of the distribution-information transmitting means 32.

In the same way as the first embodiment, the distribution-information transmitting means 32 receives a request message (S601), and thereafter, refers to all the distribution-information records 420 of the distribution-information DB 42 in order and executes the processing of S602 to S605.

The distribution-information transmitting means 32 decides whether the distribution client 1 which has transmitted a distribution-information transmission-request message is a distribution target (S603).

In further detail, first, it decides whether the system year, month and day of the distribution server 3 at the processing time is equal to or after the distribution start date 427B of the distribution-information record 420. If the system year, month and day is before the distribution start date 427B, it decides that the distribution client 1 is a distribution target, while if it is equal to or after the distribution start date 427B, it decides whether the distribution client 1 which has transmitted the distribution-information transmission-request message is set as the distribution destination 424 of the distribution-information record 420. If an IP address of the distribution client 1 is set in the distribution destination 424, it can be compared with an IP address of the transmission origin of the distribution-information transmission-request message. Unless it is set, the decision is made that it is not a distribution target.

On the other hand, if it is set, it further decides whether the distribution situation 425 of the distribution client 1 is "not transmitted", and if it is "not transmitted", it decides that the distribution client 1 is a distribution target of the distributed article 43 while unless it is "not transmitted", it decides that it is not the distribution target (S603).

If deciding that the distribution client 1 is a distribution target of the distributed article 43 (YES at S603), the distribution-information transmitting means 32 calculates a distribution request date-and-time and creates a message (distribution information) including the distributed-article ID 421 of the distribution-information record 420 and the calculated distribution request date-and-time and transmits them to the distribution client 1. Then, it sets "planned" in the distribution situation 425 of the distribution client 1 and updates the distribution-information record 420 (S604).

In S604, a distribution request date-and-time is calculated as follows. First, the distribution-information transmitting means 32 counts the number of the distribution situations 425 in which "planned" or "transmitted" is set and divides the counted number by the maximum distribution-device number 429B to thereby obtain a quotient (n: integer) and a remainder (m: integer). If m=0, it sets the date after (n+1) days from the distribution start date 427B as a distribution request date while if m≠0, it sets the date after n days from the distribution start date 427B as the distribution request date. Next, the distribution-information transmitting means 32 divides a time set in the distribution start/end time 428B by (the maximum distribution-device number 429B−1), multiplies the quotient by m, and in addition to a start time set in the distribution start/end time 428B, sets the result as a distribution request time. The distribution-information transmitting means 32 puts together the thus calculated distribution request date and distribution request time and sets them as the distribution request date-and-time.

Specifically, for example, if the distribution start date 427B is "May 28, 2008", the distribution start/end time 428B is "from 08:30 to 13:00", the distribution-device number 429B is "1000 devices" and the number of the distribution situations 425 having "planned" or "transmitted" is 1001, then n=1 and m=1. Further, the time (270 minutes from 08:30 to 13:00) set in the distribution start/end time 428B divided by (the maximum distribution-device number 429B (1000)−1) is approximately 16 seconds. Hence, the distribution request date is "May 29, 2008" and the distribution request time is "08:30:16" to thereby make the distribution request date-and-time "May 29, 2008, 08:30:16". The time of a clock provided in the distribution client 1 is frequently different from the same as the time of a clock provided in the distribution server 3. In such cases, calculating the distribution request date-and-time in a unit of one or ten seconds is not very meaningful, and thus, it may be rounded up, down or off below a unit of one minute, ten minutes or the like.

The above method of calculating the distribution request date-and-time is merely an example, and hence, it may be calculated in such a way that the number of the distribution clients 1 as distribution targets for each distribution request date does not exceed the maximum distribution-device number 429B and that the load on the distribution server 3 disperses in terms of the distribution start/end time 428B of each distribution request date.

On the other hand, if the distribution-information transmitting means 32 decides that the distribution client 1 is not a distribution target of the distributed article 43 (NO at S603), it refers to the next distribution-information record 420.

The distribution-information transmitting means 32 refers to all the distribution-information records 420 of the distribution-information DB 42 in order, executes the processing of S602 to S605, and thereafter transmits a termination message to the distribution client 1 (S606) to end the processing. S706.

FIG. 8 is a flow chart showing an operation of the distributing means 33.

In the same way as the first embodiment, the distributing means 33 receives a distributed-article request message (S801).

Next, the distributing means 33 decides whether the requested distributed article is a distribution object (S802).

In further detail, it refers to a record whose distributed-article ID 421 coincides with the distributed-article ID 211 included in the distributed-article request message among the distribution-information records 420 and thereby makes a decision as follows.

The distributing means 33 decides whether the distribution client 1 which has transmitted the distributed-article request message is set in the distribution destination 424 (e.g., an IP address of the transmission origin of the distributed-article request message is set in the distribution destination 424). Unless it is set, the distributed article is not regarded as a distribution object while if it is set, it decides whether the distribution situation 425 at the distribution destination 424 is "planned".

Unless it is "planned" (if "not transmitted" or "transmitted"), it is not regarded as a distribution object. On the other hand, if it is "planned", it compares the system year, month, day and time of the distribution server 3 at the processing time with the distribution start date 427B and the distribution start/end time 428B.

In further detail, if the system year, month and day is equal to or after the distribution start date 427B and if the system time is equal to or after the start time and equal to or before the end time of the distribution start/end time 428B, it is regarded as a distribution object. In the case where the system year, month and day is equal to or after the distribution start date 427B, even if the system time is before the start time of the distribution start/end time 428B, then the distributed article is regarded as a distribution object as long as the time interval from the system time to the start time is equal to or less than a predetermined value (e.g. ten minutes), while it is not regarded as a distribution object if the time interval is more than the predetermined value. In the same manner, in the case where the system year, month and day is equal to or after the distribution start date 427B, even if the system time is after the end time of the distribution start/end time 428B, then the distributed article is regarded as a distribution object as long as the time interval from the system time to the end time is equal to or less than a predetermined value (e.g. ten minutes), while it is not regarded as a distribution object if the time interval is more than the predetermined value. According to this processing, even if the time of a clock provided in the distribution client 1 differs, for example, by five minutes from the time of a clock provided in the distribution server 3 and the time is between the start time and the end time of the distribution start/end time 428B with respect to the clock of the distribution client 1 while it is not between the start time and the end time of the distribution start/end time 428B with respect to the clock of the distribution server 3, then it can be regarded as a distribution object, thereby preventing the discrepancy in time between the clocks from causing a failure in the distributed-article request message.

Through the above processing, if deciding that it is a distribution object (YES at S802), then in the same way as the first embodiment, the distributing means 33 creates a distribution message and transmits it to the distribution client 1 (S803), and updates the distribution-information record 420 (S804).

On the other hand, even if deciding that it is not a distribution object (NO at S802), then in the same way as the first embodiment, the distributing means 33 creates an error message and transmits it to the distribution client 1 (S805).

Upon completing the above processing, the distributing means 33 ends the processing.

In the above processing, a distribution is executed every day within a predetermined time range, and therefore, when there are a relatively large number of distribution clients 1 as distribution targets, distribution dates can be dispersed, thereby dispersing a load caused by the distribution. On the other hand, when there are a relatively small number of distribution clients 1 as distribution targets, in many cases, it is preferable to complete a distribution in one day. Accordingly, preferably, an operator of the distribution server 3 may be enabled to choose either the first embodiment or the second embodiment, or specifically, execute a distribution in one day or separately in days.

A third embodiment of the present invention capable of choosing either the first embodiment or the second embodiment will be below described.

Although the whole configuration of an electronic-data distribution system according to the third embodiment is also the same as that of FIG. 1, the third embodiment differs in the data configuration of the distribution-information DB 42 from the first embodiment and the second embodiment.

Further, a part of the operations of the distribution-information requesting means 11, the distributed-article creating means 31, the distribution-information transmitting means 32 and the distributing means 33 is different from the first embodiment and the second embodiment, though an operation of the distribution requesting means 12 is the same as the first embodiment and the second embodiment.

The third embodiment will be below described by focusing different points thereof from the first embodiment and the second embodiment.

Figure 10:
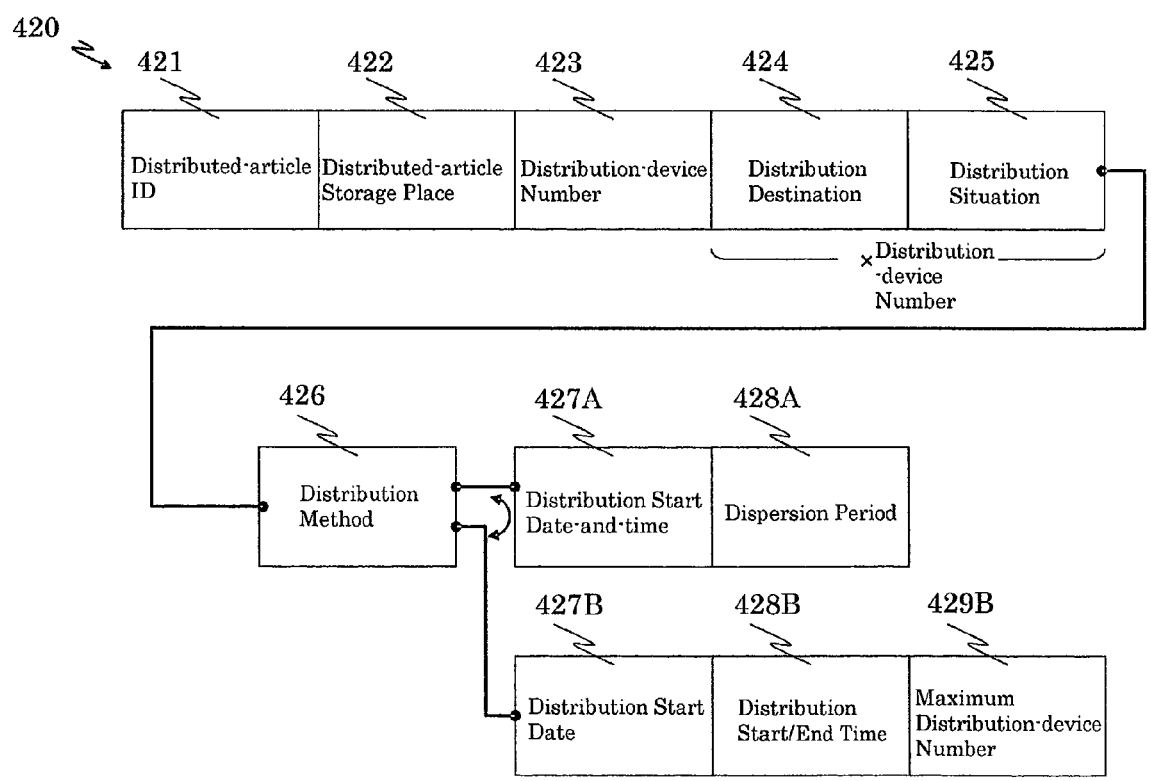
FIG. 10 is a block diagram showing an electronic-data distribution system according to a third embodiment of the present invention.

FIG. 10 is a block diagram showing a distribution-information DB 42 according to the third embodiment.

A distribution-information record 420 is made up of eleven kinds of data items—a distributed-article ID 421, a distributed-article storage place 422, a distribution-device number 423, a distribution destination 424, a distribution situation 425, a distribution method 426, a distribution start date-and-time 427A, a dispersion period 428A, a distribution start date 427B, a distribution start/end time 428B and a maximum distribution-device number 429B.

However, the single distribution-information record 420 does not contain all the data items, and in the distribution-information DB 42, two records are mixed—a record (first configuration record) made up of eight kinds of data items of the distributed-article ID 421, the distributed-article storage place 422, the distribution-device number 423, the distribution destination 424, the distribution situation 425, the distribution method 426, the distribution start date-and-time 427A and the dispersion period 428A, and a record (second configuration record) made up of nine kinds of data items of the distributed-article ID 421, the distributed-article storage place 422, the distribution-device number 423, the distribution destination 424, the distribution situation 425, the distribution method 426, the distribution start date 427B, the distribution start/end time 428B and the maximum distribution-device number 429B.

The distribution method 426 offers which data structure each record has. Specifically, the distribution method 426 has a value of either "distribute in one day" or "distribute separately in days", and if the distribution method 426 is "distribute in one day", a record is the first configuration record while a record is the second configuration record if the distribution method 426 is "distribute separately in days". An operator of the distribution server 3 designates a distribution method when creating the distributed article 43 and the distributed-article creating means 31 sets the designated distribution method in the distribution method 426.

The data items except the distribution method 426 have values similar to the first embodiment or the second embodiment.

Next, each operation of the distributed-article creating means 31, the distribution-information requesting means 11, the distribution-information transmitting means 32 and the distributing means 33 will be described in this order by focusing different points thereof from the first embodiment and the second embodiment.

FIG. 4 is a flow chart showing an operation of the distributed-article creating means 31.

In the same way as the first and second embodiments, the distributed-article creating means 31 acquires distribution information (S401), creates a distributed article (S402), and thereafter, creates the distribution-information record 420 (S403).

When creating the distributed article 43, in the same way as the first embodiment, the distributed-article creating means 31 sets the distributed-article ID 421, the distributed-article storage place 422, the distribution-device number 423, the distribution destination 424 and the distribution situation 425. Next, the distributed-article creating means 31 refers to inputted information and sets a distribution method in the distribution method 426. If the distribution method 426 is "distribute in one day", then in the same way as the first embodiment, it sets the distribution start date-and-time 427A and the dispersion period 428A, while if the distribution method 426 is "distribute separately in days", then in the same way as the second embodiment, it sets the distribution start date 427B, the distribution start/end time 428B and the maximum distribution-device number 429B.

Upon creating the distribution-information record 420, the distributed-article creating means 31 ends the processing.

FIG. 5 is a flow chart showing an operation of the distribution-information requesting means 11.

In the same way as the first and second embodiments, the distribution-information requesting means 11 executes a distribution-information request (S501), a message reception (S502) and a termination-message decision (S503).

If the received message is not a termination message (NO at S503), then creates request information using the received message (S504).

In further detail, if the distribution method 426 included in the received message is "distribute in one day", in the same way as the first embodiment, the distribution-information requesting means 11 refers to the dispersion period 428A included in the received message and determines a distribution request date-and-time, and sets the distributed-article ID 421 included in the received message in the distributed-article ID 211, the distribution request date-and-time in the distribution request date-and-time 212 and zero in the failure number 213 to thereby create the distribution request record 210. On the other hand, if the distribution method 426 included in the received message is "distribute separately in days", in the same way as the second embodiment, it sets the distributed-article ID 421 included in the received message in the distributed-article ID 211, a distribution request date-and-time included in the received message in the distribution request date-and-time 212 and zero in the failure number 213 to thereby create the distribution request record 210.

Next, the distribution-information requesting means 11 schedules the distribution requesting means 12 to be activated at the distribution request date-and-time (S505), and waits again for the distribution server 3 to transmit a message (S502).

FIG. 6 is a flow chart showing an operation of the distribution-information transmitting means 32.

In the same way as the first and second embodiments, the distribution-information transmitting means 32 receives a request message (S601), and thereafter, refers to all the distribution-information records 420 of the distribution-information DB 42 in order and executes the processing of S602 to S605.

The distribution-information transmitting means 32 decides whether the distribution client 1 which has transmitted a distribution-information transmission-request message is a distribution target (S603). At this time, if the distribution method 426 for the distribution-information record 420 is "distribute in one day", it makes a decision in the same way as the first embodiment while if the distribution method 426 is "distribute separately in days", it makes a decision and updates the distribution-information record 420 in the same way as the second embodiment.

On the other hand, if the distribution-information transmitting means 32 decides that the distribution client 1 is not a distribution target of the distributed article 43 (NO at S603), it refers to the next distribution-information record 420.

The distribution-information transmitting means 32 refers to all the distribution-information records 420 of the distribution-information DB 42 in order, executes the processing of S602 to S605, and thereafter transmits a termination message to the distribution client 1 (S606) to end the processing. S706.

FIG. 8 is a flow chart showing an operation of the distributing means 33.

In the same way as the first and second embodiments, the distributing means 33 receives a distributed-article request message (S801).

Next, the distributing means 33 decides whether the requested distributed article is a distribution object (S802).

At this time, if the distribution method 426 for the distribution-information record 420 is "distribute in one day", it makes a decision in the same way as the first embodiment while if the distribution method 426 is "distribute separately in days", it makes a decision in the same way as the second embodiment.

If deciding that it is a distribution object (YES at S802), then in the same way as the first and second embodiments, the distributing means 33 creates a distribution message and transmits it to the distribution client 1 (S803), and updates the distribution-information record 420 (S804).

On the other hand, even if deciding that it is not a distribution object (NO at S802), then in the same way as the first and second embodiments, the distributing means 33 creates an error message and transmits it to the distribution client 1 (S805).

Upon completing the above processing, the distributing means 33 ends the processing.

In the above processing, when creating the distributed article 43, an operator of the distribution server 3 can choose either of executing a distribution in one day or separately in days.

In any of the first to third embodiments, an embodiment is possible in which the storage 2 does not include the request-information DB 21. Saving the request-information DB 21 enables the distribution client 1 to do without any database management program, and thereby, the electronic-data distribution system can be more easily built.

In the embodiment where the storage 2 does not include the request-information DB 21, a record having the same data configuration as the request-information record 210 may be stored in not the storage 2 but a main storage of the distribution client 1. In this case, the operation of each means is the same as the operation described so far, except for creating, updating and deleting not the request-information record 210 but a record in the main storage.

Further, in the embodiment where the storage 2 does not include the request-information DB 21, only one request-information record can be stored in the main storage, and in this case, the operation of each means described so far differs in the following respect.

In FIG. 5, when creating request information using a received message (S504), the distribution-information requesting means 11 stores the distributed-article ID 421 included in the received message, a calculated distribution request date-and-time and a failure number (whose value is set to zero) in a main storage of the distribution client 1. In other words, it does not create the request-information record 210.

In FIG. 6, if deciding that the distributed article 43 is a distribution object for the distribution client 1 (S603), the distribution-information transmitting means 32 transmits distribution information (S604) and then does not refer to the next distribution-information record 420. In other words, if finding one distribution-information record 420 as a distribution object, then without referring to another distribution-information record 420, it ends the repetitious processing of S602 to S605. At this time, it refers to the distribution-information record 420, for example, in order of the lapse (earliness of the date and time or the like) in the distribution start date-and-time 427A or the distribution start date 427B, thereby making it possible to regard the distribution-information record 420 required to be earlier distributed in order as a distribution object.

In FIG. 7, when transmitting a distributed-article request message to the distribution server 3 (S701), without referring to all the request-information records 210 of the request-information DB 21, the distribution requesting means 12 compares the system year, month, day and time of the distribution client 1 at the processing time with a distribution request date-and-time stored in the main storage.

If the system year, month, day and time is equal to or after the distribution request date-and-time, it creates a distributed-article request message including a distributed-article ID stored in the main storage and transmits it to the distribution server 3. Further, without deleting the request-information record 210, it erases the distribution request date-and-time or the like from the main storage or does such another to thereby return to a state in which the distribution request date-and-time or the like is not stored in the main storage (S705). Then, it adds one to not the failure number 213 of the request-information record 210 but a failure number stored in the main storage (S706).

As described above, in the case where there is no request-information DB 21, for example, information such as a distributed-article ID stored in the main storage is lost when stopping the system of the distribution client 1 and turning the power off. However, as described earlier, if the distribution-information requesting means 11 is activated every time the distribution client 1 logs in for the distribution server 3, then a distributed-article ID or the like can be acquired again on this occasion, thereby especially raising no problem in the first embodiment.

In the second and third embodiments, when "distribute separately in days" is set in the distribution method 426, the processing may be as follows.

In S603, the distribution-information transmitting means 32 decides that the distribution client 1 is a distribution target of the distributed article 43 if the distribution situation 425 of the distribution client 1 is not only "not transmitted" but also "planned" (S603).

If the distribution situation 425 is "planned", then in S604, the processing may be executed in the same way as the case where the distribution situation 425 is "not transmitted", and in this case, a distribution request date-and-time is again calculated. On the other hand, for example, when "planned" is set in the distribution situation 425 having "not transmitted", the calculated distribution request date-and-time as well is set in the distribution-information record 420. In S604, if "planned" is already set in the distribution situation 425, without calculating a distribution request date-and-time, a message (distribution information) including a distribution request date-and-time set in the distribution-information record 420 may be created and transmitted to the distribution client 1. This makes it possible to transmit the already-transmitted distribution request date-and-time again without calculating a distribution request date-and-time again when the distribution information is already transmitted.

What is claimed is:

1. An electronic-data distribution system which includes a distribution server transmitting a distributed article of electronic data and a distribution client receiving a distributed article connected communicably with the distribution server, wherein:

the distribution client includes a distribution-information requesting means for requesting the distribution server to transmit at least a part of a distribution plan and a distribution requesting means for requesting the distribution server to transmit a distributed article;

the distribution server includes a distributed-article creating means for creating a distributed article of electronic data using electronic data as a distribution object, a distribution-information transmitting means for transmitting, to the distribution client, at least a part of distribution information as a distribution plan stored in a distribution-information database provided in the distribution server, and a distributing means for transmitting a distributed article for which a transmission request is made to the distribution client;

the distributed-article creating means includes a means for acquiring distribution information based on input information including a distribution client, a distribution start date-and-time and a dispersion period inputted by an operator of the distribution server, a means for referring to the distribution information, acquiring electronic data from a storage provided in the distribution server and creating a distributed article of electronic data, and a means for setting the distribution information to each data item to create a distribution-information record and storing the distribution-information record in the distribution-information database;

the distribution-information requesting means includes a means for transmitting a distribution-information transmission-request message to the distribution server, and a means for receiving distribution information from the distribution server, then setting a distribution request date-and-time and a failure number using the received distribution information to thereby create request information, and storing the request information in a request-information database provided in the distribution client;

the distribution-information transmitting means includes a means for receiving a distribution-information transmission-request message from the distribution client, then referring to all distribution-information records of the distribution-information database in order, and deciding whether the distribution client which has transmitted the distribution-information transmission-request message is set as the distribution destination of each distribution-information record, a means for, if this distribution client is set as the distribution destination, then deciding whether the distribution situation of the distribution-information record to the distribution client is "not transmitted", and if it is "not transmitted", then deciding that the distribution client is a distribution target for a distributed article, and a means for, if the decision is made that this distribution client is a distribution target for a distributed article, then creating distribution information including a distributed-article ID and a dispersion period of the distribution-information record and transmitting the distribution information to the distribution client;

the distribution requesting means includes a means for referring to all request-information records of the request-information database in order and comparing a system year, month, day and time of the distribution client at a processing time with a distribution request date-and-time, a means for, if the system year, month, day and time is equal to or after the distribution request date-and-time, then creating a distributed-article request message and transmitting the distributed-article request message to the distribution server, a means for receiving a distribution message from the distribution server and then referring to a distribution permission code included in the distribution message, a means for, if the distribution permission code is "distribution permitted", storing a distributed article included in the distribution message in a storage provided in the distribution client, and a means for deleting a record whose distributed-article ID coincides with a distributed-article ID included in the distribution message among the request-information records of the request-information database; and the distributing means includes a means for, if the distribution server receives a distributed-article request message from the distribution client, then deciding whether a requested distributed article is a distribution object, a means for, if the decision is made that the distributed article is a distribution object, then referring to a storage place of the distributed article and acquiring the distributed article, creating a distribution permission code indicating "distribution permitted", a distributed-article ID and a distribution message including the distributed article and transmitting the distribution permission code, the distributed-article ID and the distribution message to the distribution client, and a means for setting "transmitted" to the distribution situation of the distribution destination and updating the distribution-information record.

2. The electronic-data distribution system according to claim 1, wherein:

the distributed-article creating means includes a means for, when creating the distribution-information record, instead of the distribution start date-and-time and dispersion period, referring to information inputted by an operator of the distribution server and setting a distribution start date, a distribution start/end time and a maximum distribution-device number;

the distribution-information requesting means includes a means for setting a distribution request date-and-time included in a received distribution information to a distribution request date-and-time for request information;

the distribution-information transmitting means includes a means for, if the decision is made that a distribution client is a distribution target for a distributed article, then calculating a distribution request date-and-time in such a way that the number of distribution clients as distribution targets on each distribution request date does not exceed the maximum distribution-device number and that a load dispersion is executed at a distribution start/end time of each distribution request date, a means for creating distribution information including a distributed-article ID of a distribution-information record and a calculated distribution request date-and-time and transmitting the distribution information to the distribution client, and a means for setting "planned" to the distribution situation of the distribution client and updating the distribution-information record; and the distributing means includes a means for, if a distribution client which has transmitted a distributed-article request message is set at a distribution destination, then deciding whether the distribution situation of a distribution-information record at the distribution destination is "planned", a means for, if it is "planned", then comparing a system year, month, day and time of a distribution server at a processing time with a distribution start date and a distribution start/end time, and a means for deciding on a distribution object if the system year, month and day is equal to or after the distribution start date and if the system time is equal to or after the start time and equal to or before the end time of the distribution start/end time.

3. The electronic-data distribution system according to claim 1, wherein:

the distributed-article creating means includes a means for referring to information inputted by an operator of the distribution server and setting a distribution method instead of the distribution start date-and-time and dispersion period of the distribution-information record, a means for, if the distribution method is "distribute in one day", then further setting a distribution start date-and-time and a dispersion period, and a means for, if the distribution method is "distribute separately in days", then further setting a distribution start date, a distribution start/end time and a maximum distribution-device number;

the distribution-information requesting means includes a means for, if a distribution method included in received distribution information is "distribute in one day", then referring to a dispersion period included in the received distribution information and determining a distribution request date-and-time, setting a distributed-article ID and a distribution request date-and-time included in the received distribution information, setting the failure number and creating a distribution request record, and on the other hand, if the distribution method included in received distribution information is "distribute separately in days", then setting a distribution request date-and-time, setting a distributed-article ID and a distribution request date-and-time included in the received distribution information, setting a failure number and creating a distribution request record;

the distribution-information transmitting means includes a means for, if a distribution method for a distribution-information record is "distribute in one day", then deciding whether the distribution situation of the distribution client is "not transmitted", and if it is "not transmitted", then deciding that the distribution client is a distribution target for a distributed article, and a means for, if the distribution method is "distribute separately in days", then when the decision is made that the distribution client is a distribution target for a distributed article, calculating a distribution request date-and-time in such a way that the number of distribution clients as distribution targets on each distribution request date does not exceed the maximum distribution-device number and that a load dispersion is executed at a distribution start/end time of each distribution request date, a means for creating distribution information including a distributed-article ID of a distribution-information record and a calculated distribution request date-and-time and transmitting the distribution information to a distribution client, and a means for setting "planned" to the distribution situation of the distribution client and updating the distribution-information record; and the distributing means includes a means for, if a distribution method for a distribution-information record is "distribute in one day", then deciding whether a requested distributed article is a distribution object, a means for, if the decision is made that the distributed article is a distribution object, then referring to a storage place of the distributed article and acquiring the distributed article, creating a distribution permission code indicating "distribution permitted", a distributed-article ID and a distribution message including the distributed article and transmitting the distribution permission code, the distributed-article ID and the distribution message to the distribution client, and a means for setting "transmitted" to the distribution situation of the distribution destination and updating the distribution-information record, a means for, if the distribution method is "distribute separately in days", then deciding whether a distribution client which has transmitted a distributed-article request message is set at a distribution destination of the distribution-information record, a means for, if the distribution client is set at the distribution destination, then deciding whether the distribution situation of the distribution destination is "planned", a means for, if it is "planned", then comparing a system year, month, day and time of a distribution server at a processing time with a distribution start date and a distribution start/end time, and a means for deciding on a distribution object if the system year, month and day is equal to or after the distribution start date and if the system time is equal to or after the start time and equal to or before the end time of the distribution start/end time.

* * * * *